United States Patent [19]

Reiffenrath et al.

[11] Patent Number: 5,230,827

[45] Date of Patent: * Jul. 27, 1993

[54] DERIVATIVES OF 2,3-DIFLUOROBENZOIC ACID

[75] Inventors: Volker Reiffenrath, Rossdorf; Joachim Krause, Dieburg; Andreas Wächtler, Griesheim; Georg Weber, Erzhausen; Thomas Geelhaar, Mainz, all of Fed. Rep. of Germany

[73] Assignee: Merck Patent Gesellschaft mit beschrankter Haftung, Darmstadt, Fed. Rep. of Germany

[*] Notice: The portion of the term of this patent subsequent to Mar. 30, 2010 has been disclaimed.

[21] Appl. No.: 359,673

[22] PCT Filed: Feb. 27, 1989

[86] PCT No.: PCT/EP89/00183

§ 371 Date: May 12, 1989

§ 102(e) Date: May 12, 1989

[87] PCT Pub. No.: WO89/08688

PCT Pub. Date: Sep. 21, 1989

[30] Foreign Application Priority Data

Mar. 10, 1988 [DE] Fed. Rep. of Germany ....... 3807823
Mar. 10, 1988 [DE] Fed. Rep. of Germany ....... 3807870
Mar. 10, 1988 [DE] Fed. Rep. of Germany ....... 3807955

[51] Int. Cl.[5] .............. C09K 19/34; C09K 19/20; C07D 239/02; C07D 211/70
[52] U.S. Cl. .................. 252/299.61; 252/299.63; 252/299.66; 252/299.67; 560/65; 560/102; 544/224; 544/298; 546/339
[58] Field of Search ............ 252/299.01, 299.63, 252/299.66, 299.67, 299.61; 544/298, 224; 546/339, 342

[56] References Cited

U.S. PATENT DOCUMENTS 4,368,135 1/1983 Osman ........................... 252/299.63
4,415,470 11/1983 Eidenschink et al. ......... 252/299.63

(List continued on next page.)

FOREIGN PATENT DOCUMENTS 0051738 3/1981 European Pat. Off. .
0133489 7/1984 European Pat. Off. .
1229842 10/1986 Japan .
WO88/02130 3/1988 World Int. Prop. O. .

OTHER PUBLICATIONS

Osman et al., "Stable Liquid Crystals With Large Negative Dielectric Anisotropy—II," Mol. Cryst. Liq. Cryst., vol. 92 (Letters), pp. 57-62, 1983.

Primary Examiner—Richard D. Lovering
Assistant Examiner—C. Harris
Attorney, Agent, or Firm—Millen, White, Zelano and Branigan

[57] ABSTRACT

Derivatives of 2,3-Difluorobenzoic acid compounds of the formula I

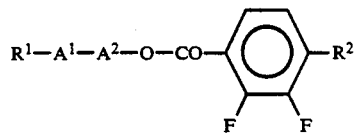

in which $R^1$ and $R^2$, independently of one another, are each an alkyl group having 1 to 15 C atoms, in which, in addition, one or two non-adjacent $CH_2$ groups may be replaced by —O—, —CO—, —CH=CH— and/or —C≡C—, and $A^1$ and $A^2$, independently of one another, are each 1,4-phenylene which is unsubstituted or substituted by one or two fluorine atoms, and in which, in addition, one or two CH groups may be replaced by N, or are trans 1,4-cyclohexylene, or one of the two $A^1$ and $A^2$ groups is alternatively a single bond, are suitable as components of liquid-crystalline phases.

18 Claims, No Drawings

U.S. PATENT DOCUMENTS

| | | | |
|---|---|---|---|
| 4,514,317 | 4/1985 | Tuong et al. | 252/299.62 |
| 4,545,922 | 10/1985 | Eidenschink et al. | 252/299.63 |
| 4,551,264 | 11/1985 | Eidenschink et al. | 252/299.62 |
| 4,602,851 | 7/1986 | Jenner et al. | 359/103 X |
| 4,606,845 | 8/1986 | Romer et al. | 252/299.63 |
| 4,637,897 | 1/1987 | Kelly | 252/299.63 |
| 4,659,502 | 4/1987 | Fearon et al. | 252/299.61 |
| 4,664,840 | 5/1987 | Osman | 252/299.63 |
| 4,709,030 | 11/1987 | Petrzilka et al. | 544/242 |
| 4,710,315 | 12/1987 | Schad et al. | 252/299.63 |
| 4,724,097 | 2/1988 | Romer et al. | 252/299.63 |
| 4,776,973 | 10/1988 | Bofinger et al. | 252/299.61 |
| 4,808,333 | 2/1989 | Huynh-ba et al. | 252/299.66 |
| 4,820,839 | 4/1989 | Krause et al. | 544/316 |
| 4,834,904 | 5/1989 | Krause et al. | 252/299.01 |
| 4,846,998 | 7/1989 | Pohl et al. | 252/299.63 |
| 4,897,216 | 1/1990 | Reiffenrath et al. | 252/299.63 |
| 4,925,278 | 5/1990 | Buchecker et al. | 252/299.01 |
| 4,925,590 | 5/1990 | Reiffenrath et al. | 252/299.61 |
| 5,087,764 | 2/1992 | Reiffenrath et al. | 568/656 |

DERIVATIVES OF 2,3-DIFLUOROBENZOIC ACID

SUMMARY OF THE INVENTION

The invention relates to derivatives of 2,3-difluorobenzoic acid of the formula I

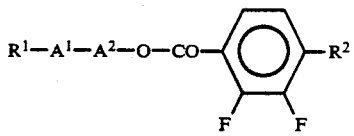

in which
R$^1$ and R$^2$, independently of one another, are each an alkyl group having 1 to 15 C atoms, in which, in addition, one or two non-adjacent CH$_2$ groups may be replaced by —O—, —CO—, —CH=CH— and/or —C≡C—, and
A$^1$ and A$^2$, independently of one another, are each 1,4-phenylene which is unsubstituted or substituted by one or two fluorine atoms and in which, in addition, one or two CH groups may be replaced by N, or are trans-1,4-cyclohexylene, or one of the two A$^1$ and A$^2$ groups is alternatively a single bond.

For reasons of simplicity below, Cyc is a 1,4-cyclohexylene group, Phe is a 1,4-phenylene group, Pyd is a pyridine-2,5-diyl grop, Pyr is a pyrimidine-2,5-diyl group and Pyn is a pyridazine-2,5-diyl group, where these groups may be unsubstituted or substituted by one or two fluorine atoms. These groups are preferably unsubstituted.

PheF$_2$ is a group of the formula

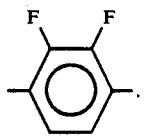

The compounds of the formula I can be used as components of liquid-crystalline phases, in particular for displays based on the principle of the twisted cell, on the guesthost effect, on the effect of deformation of aligned phases or on the effect of dynamic scattering.

The compounds of the formula I are distinguished by a clearly negative anisotropy of the dielectric constants and are aligned in an electrical field with their longitudinal molecular axes perpendicular to the field direction. This effect is known and is utilized in various liquid-crystalline displays for controlling the optical transparency, thus, for example, in liquid-crystal cells of the light-scattering type (dynamic scattering), of the so-called DAP type (deformation of aligned phases) or ECB type (electrically controlled birefringence) or of the guest/host type (guest/host interaction).

In addition, compounds of the formula I are suitable as components of chirally tilted smectic phases. Chiral tilted smectic liquid-crystalline phases having ferroelectric properties can be prepared by adding a suitable chiral dope to the base mixtures having one or more tilted smectic phases (L. A. Veresnev et al., Mol. Cryst. Liq. Cryst. 89, 327 (1982); H. R. Brand et al., J. Physique 44 (lett.), L-771 (1983). Phases of this type can be used as dielectrics for rapidly switching displays which are based, for example, on the principle of SSFLC technology, described by Clark and Lagerwall (N. A. Clark and S. T. Lagerwall, Appl. Phys. Lett. 36, 899 (1980); U.S. Pat. No. 4,367,924), on the basis of the ferroelectric properties of the chiral tilted phase.

A number of liquid-crystalline compounds having slightly negative dielectric anisotropy has previously been synthesized. In contrast, relatively few liquid-crystal components having a large negative anisotropy of the dielectric constants are known. In addition, the latter generally have disadvantages, such as, for example, poor solubility in mixtures, high viscosity, high melting point and chemical instability. There is therefore a demand for further compounds having a negative dielectric anisotropy which permit the properties of mixtures to be further improved for a very wide variety of electrooptical applications.

Liquid-crystal compounds which have a negative dielectric anisotropy and contain two or three rings linked via carboxyl groups or covalent bonds and one or more side groups, such as halogen, cyano or nitro groups, are known from DE 2,240,864, DE 2,613,293, DE 2,835,662, DE 2,836,086 and EP 023,728.

The compounds claimed here are covered by a broad formula given in EP 084,194. However, no individual compounds of the formula according to the invention are mentioned therein. For those skilled in the art, it was thus possible neither to easily deduce possible syntheses of the compounds claimed nor to recognize that the compounds according to the invention have mesophase ranges which are predominantly in a favorable position and that the compounds are distinguished by a large negative anisotropy of the dielectric constants with low viscosity at the same time.

In addition, there is absolutely no indication of the possibility of using the compounds according to the invention in displays based on SSFLC technology since the compounds claimed therein have low smectic tendencies.

Furthermore, dibenzoic acid esters of 2,3-dichlorohydroquinone are known (for example Bristol et al., J. Org. Chem. 39, 3138 (1974) or Clanderman et al., J. Am. Chem. Soc. 97, 1585 (1975)), but these are monotropic or have very small mesophase ranges. The esters of 4-hydroxy-2,3-dichlorobenzoic acid described by Eidenschink et al. (Angew. Chem. 89, 103 (1977)) likewise only have narrow mesophase ranges.

The 4-alkyl-2,3-dichlorophenyl-4'-alkylbicyclohexyl-4-carboxylic acid esters known from German Offenlegungsschrift 2,933,563 cannot be used in industry due to their high viscosity.

The invention had the object of indicating stable, liquid-crystalline or mesogenic compounds having a large negative anisotropy of the dielectric constants and a low viscosity at the same time.

It has been found that the compounds of the formula I are preeminently suitable as components of liquid-crystalline phases. In particular, they can be used to prepare stable liquid-crystalline phases having a broad mesophase range and comparatively low viscosity.

Furthermore, the compounds of the formula I are suitable as components of chiral tilted smectic liquid-crystalline phases.

In addition, the provision of the compounds of the formula I very generally considerably extends the range of liquid-crystalline substances which are suitable from various applicational points of view for the preparation of liquid-crystalline mixtures.

The compounds of the formula I have a broad field of application. Depending on the choice of substituents, the compounds can be used as base materials from which liquid-crystalline phases are predominantly composed; however, compounds of the formula I can also be added to liquid-crystalline base materials from other classes of compounds in order, for example, to vary the dielectric and/or optical anisotropy and/or the viscosity and/or the spontaneous polarization and/or the phase ranges and/or the tilt angle and/or the pitch of a dielectric of this type.

The compounds of the formula I are furthermore suitable as intermediates in the preparation of other substances which can be used as components of liquid-crystalline dielectrics.

The compounds of the formula I are colorless in the pure state and form liquid-crystalline mesophases in a temperature range which is favourable for electrooptical use. They are very stable chemically, thermally and to light.

The invention thus relates to compounds of the formula I and to a process for their preparation, characterized in that an appropriate carboxylic acid or one of its reactive derivatives is reacted with an appropriate hydroxyl compound or with one of its reactive derivatives.

The invention furthermore relates to the use of the compounds of the formula I as components of liquid-crystalline phases. The invention furthermore relates to liquid-crystalline phases containing at least one compound of the formula I, and to liquid-crystal display elements which contain phases of this type. Phases of this type have particularly advantageous elastic constants, and are particularly suitable for TFT mixtures due to their low $\Delta\epsilon/\epsilon_\perp$.

Of the compounds of the formula I, those are preferred in which at least one of the groups $A^1$ and $A^2$ is a 1,4-phenylene group in which one or two CH groups are replaced by N.

Particularly preferred compounds of the formula I are those in which

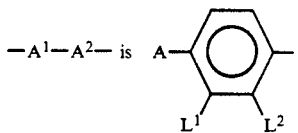

in which
A is 1,4-phenylene which is unsubstituted or substituted by one or two fluorine atoms, or is trans-1,4-cyclohexylene or a single bond, and
$L^1$ and $L^2$, independently of one another, are each H or F.

Finally, preferred compounds of the formula I are those in which

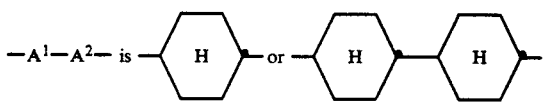

Accordingly, the invention relates in particular to compounds in which $—A^1—A^2—$ has the preferred meanings indicated, and to the process mentioned for their preparation and to their use as components of liquid-crystalline phases, for example in liquid-crystal display elements.

Above and below, $R^1$, $R^2$, A, $A^1$, $A^2$, $L^1$ and $L^2$ have the meaning indicated, unless expressly stated otherwise.

The compounds of the formula I accordingly include dinuclear compounds of the sub—formulae Ia to Ie:

| | |
|---|---|
| $R^1$—Pyd—OCO—PheF$_2$—R$^2$ | Ia |
| $R^1$—Pyr—OCO—PheF$_2$—R$^2$ | Ib |
| $R^1$—Pyn—OCO—PheF$_2$—R$^2$ | Ic |
| $R^1$—Phe—OCO—PheF$_2$—R$^2$ | Id |
| $R^1$—Cyc—OCO—PheF$_2$—R$^2$ | Ie | and trinuclear compounds of the sub-formulae If to Il

| | |
|---|---|
| $R^1$—Phe—Pyd—OCO—PheF$_2$—R$^2$ | If |
| $R^1$—Phe—Pyr—OCO—PheF$_2$—R$^2$ | Ig |
| $R^1$—Phe—Pyn—OCO—PheF$_2$—R$^2$ | Ih |
| $R^1$—Phe—Phe—OCO—PheF$_2$—R$^2$ | Ii |
| $R^1$—Cyc—Phe—OCO—PheF$_2$—R$^2$ | Ik |
| $R^1$—Cyc—Cyc—OCO—PheF$_2$—R$^2$ | Il |
| $R^1$—Pyd—Phe—OCO—PheF$_2$—R$^2$ | Im |
| $R^1$—Pyr—Phe—OCO—PheF$_2$—R$^2$ | In |
| $R^1$—Pyn—Phe—OCO—PheF$_2$—R$^2$ | Io |
| $R^1$—Pyd—Cyc—OCO—PheF$_2$—R$^2$ | Ip |
| $R^1$—Pyr—Cyc—OCO—PheF$_2$—R$^2$ | Iq |
| $R^1$—Pyn—Cyc—OCO—PheF$_2$—R$^2$ | Ir |
| $R^1$—Cyc—Pyd—OCO—PheF$_2$—R$^2$ | Is |
| $R^1$—Cyc—Pyr—OCO—PheF$_2$—R$^2$ | It |
| $R^1$—Cyc—Pyn—OCO—PheF$_2$—R$^2$ | Iu |

Of these, those of the sub-formulae Ii, Ik, Il, Im, In and Io are particularly preferred.

In the compounds of the formulae above and below, $R^1$ and $R^2$ are preferably alkyl or alkoxy.

Furthermore preferred compounds are those of the formulae above and below in which one of the radicals $R^1$ and $R^2$ is alkenyl or oxaalkyl (for example alkoxymethyl).

$A^1$ and $A^2$ are preferably unsubstituted 1,4-phenylene, Cyc, Pyd or Pyr; the compound of the formula I preferably contains not more than one each of the radicals Pyd, Pyn, Pyr or 2,3-difluoro-1,4-phenylene.

In compounds in which at least one of the groups $A^1$ and $A^2$ is 1,4-phenylene in which one or two CH groups are replaced by N, at least one of the groups $A^1$ and $A^2$ (but preferably only one of the two groups) is preferably pyridine-2,5-diyl, pyrimidine-2,5-diyl or pyrazine-3,6-diyl. Pyridine-2,5-diyl and pyrimidine-2,5-diyl are preferred here.

A is preferably unsubstituted 1,4-phenylene or Cyc.

In the formulae above and below, $R^1$ and $R^2$ preferably have 2-12 C atoms, in particular 3-10 C atoms. In $R^1$ and R², one or two CH₂ groups may also be replaced. Preferably, only one CH₂ group is replaced by —O— or —CH=CH—.

In the formulae above and below, $R^1$ and $R^2$ are preferably alkyl, alkoxy or another oxaalkyl group, and furthermore alkyl groups in which one or two CH₂ groups may be replaced by —CH=CH—.

If $R^1$ and $R^2$ are alkyl radicals in which, in addition, one ("alkoxy" or "oxaalkyl") or two ("alkoxyalkoxy" or "dioxaalkyl") non-adjacent CH₂ groups may be replaced by O atoms, they may be straight-chain or branched. They are preferably straight-chain, have 2, 3, 4, 5, 6 or 7 C atoms and accordingly are preferably ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

Oxaalkyl is preferably straight-chain 2-oxypropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl, 1,3-dioxabutyl (=methoxymethoxy), 1,3-, 1,4- or 2,4-dioxapentyl, 1,3-, 1,4-, 1,5-, 2,4-, 2,5- or 3,5-dioxahexyl, 1,3-, 1,4-, 1,5-, 1,6-, 2,4-, 2,5-, 2,6-, 3,5-, 3,6- or 4,6-dioxaheptyl.

If $R^1$ and $R^2$ are an alkyl radical, in which one CH₂ group is replaced by —CH=CH—, the trans form is preferred. This alkenyl radical may be straight-chain or branched.

It is preferably straight-chain and has 2 to 10 C atoms. Accordingly, it is particularly vinyl, prop-1- or prop-2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl or dec-1-, -2-, -3-, -4-, -5-, -6-, -7-, -8- or -9-enyl.

Compounds of the formula I having branched wing groups $R^1$ and/or $R^2$ may occasionally be important due to their better solubility in the customary liquid-crystalline base materials, but in particular as chiral dopes if they are optically active. Smectic compounds of this type are suitable as components of ferroelectric materials.

Branched groups of this type generally contain not more than one chain branch. Preferred branched radicals $R^1$ and/or $R^2$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy, 1-methylheptoxy, 2-oxa-3-methylbutyl,3-oxa-4-methylpentyl,4-methylhexyl, 2-nonyl, 2-decyl, 2-dodecyl and 6-methyloctoxy.

The formula I includes the racemates of these compounds and the optical antipodes, and mixtures thereof.

Of the compounds of the formula I and to Ia to Iu, those are preferred in which at least one of the radicals present therein has one of the preferred meanings mentioned.

The compounds of the formula I are prepared by methods known per se, as described in the literature (for example in the standard works such as Houben-Weyl, Methoden der Organischen Chemie [Methods of organic chemistry], Georg-Thieme-Verlag, Stuttgart), more precisely under reaction conditions which are known and suitable for the reactions mentioned. Use can also be made here of variants which are known per se, but which are not described here in greater detail.

If desired, the starting materials can also be formed in situ by not isolating them from the reaction mixture, but instead immediately reacting them further to form the compounds of the formula I.

The compounds of the formula I are accessible starting from 1,2-difluorobenzene. This is metallated by a known process for example A. M. Roe et al., J. Chem. Soc. Chem. Comm., 22, 582 (1965)) and reacted with the appropiate electrophile. This reaction sequence can be carried out a second time with the 1-R²-2,3-difluorobenzene obtained in this way using $CO_2$ as the electrophile, to give the 2,3-difluoro-4-R²-benzoic acids 1,2-Difluorobenzene or 1-R²-2,3-difluorobenzene is reacted with phenyllithium, lithium tetramethlpiperidine, or n-sec- or tertbutyllithium in an inert solvent, such as diethyl ether, tetrahydrofuran, dimethoxyethane, tertbutyl methyl ether or dioxane, hydrocarbons, such as hexane, heptane cyclohexane, benzene or toluene, or mixtures of these solvents, if appropiate with addition of a complexing agent, such as tetramethylethylenediamine (TMEDA) or hexamethylphosphoric triamide, at temperatures of from −100° C. to +50° C., preferably −78° C. to 0° C.

The lithium 2,3-difluorophenyl compounds are reacted with the appropriate electrophiles at −100° C. to 0° C., preferably at −50° C. Suitable electrophiles are aldehydes, ketones, nitriles, epoxides, carboxylic acid derivatives, such as esters, anhydrides or halides, haloformic acid esters or carbon dioxide.

For reaction with aliphatic or aromatic halogen compounds, the lithium 2,3-difluorophenyl compounds are transmetallated and coupled with transition-metal catalysis. The zinc (cf. German Offenlegungsschrift 3,632,410) or titanium 2,3-difluorophenyl compounds (cf. German Offenlegungsschrift 3,736,489) are particularly suitable for this purpose.

The compounds of the formula I can be prepared by esterification of appropriate carboxylic acids (or reactive derivatives thereof) using alcohols or phenols (or reactive derivatives thereof).

Suitable reactive derivatives of the carboxylic acids mentioned are, in particular, the acyl halides, above all the chlorides or bromides, furthermore the anhydrides, for example also mixed anhydrides, azides or esters, in particular alkyl esters having 1-4 C atoms in the alkyl group.

Suitable reactive derivatives of the alcohols and phenols mentioned are, in particular, the appropriate metal alkoxides or phenoxides, preferably of an alkali metal such as Na or K.

The esterification is advantageously carried out in the presence of an inert solvent. Highly suitable solvents are, in particular, ethers, such as diethyl ether, di-n-butyl ether, THF, dioxane or anisole, ketones, such as acetone, butanone or cyclohexanone, amides, such as DMF or hexamethylphosphoric triamide, hydrocarbons, such as benzene, toluene or xylene, halogenated hydrocarbons, such as tetrachloromethane or tetrachloroethylene, and sulfoxides, such as dimethyl sulfoxide or sulfolane. Water-immiscible solvents can at the same time advantageously be used for removal of the water formed during the esterification by azeotropic distillation. It is sometimes also possible to use an excess of an organic base, for example pyridine, quinoline or triethylamine, as the solvent for the esterification. The esterification can also be carried out in the absence of the solvent, for example by simply heating the components in the presence of sodium acetate. The reaction temperature is usually between −50° and +250°, preferably between −20° and +80°. At these temperatures, the esterification reactions are generally complete after 15 minutes to 48 hours.

In detail, the reaction conditions for the esterification depend substantially on the nature of the starting materials used. Thus, a free carboxylic acid is generally reacted with a free alcohol or phenol in the presence of a strong acid, for example a mineral acid such as hydrochloric acid or sulfuric acid. A preferred reaction procedure is the reaction of an acid anhydride or, in particular, an acyl chloride with an alcohol, preferably in a basic medium, important bases being, in particular, alkali metal hydroxides, such as sodium hydroxide or potassium hydroxide, alkali metal carbonates or hydrogen carbonates, such as sodium carbonate, sodium hydrogen carbonate, potassium carbonate or potassium hydrogen carbonate, alkali metal acetates, such as sodium acetate or potassium acetate, alkaline earth metal hydroxides, such as calium hydroxide, or organic bases, such as triethylamine, pyridine, lutidine, collidine or quinoline. A further preferred way of carrying out the esterification is to firstly convert the alcohol or the phenol into the alkoxide or phenoxide of sodium or potassium, for example by treatment with ethanolic sodium hydroxide solution or potassium hydroxide solution, isolating the alkoxide or phenoxide and suspending it in acetone or diethyl ether with stirring together with sodium hydrogen carbonate or potassium carbonate, and adding a solution of the acyl chloride or anhydride in diethyl ether, acetone or DMF to this suspension, expediently at temperatures between about −25° and +20°.

The liquid-crystalline media according to the invention preferably contain 2 to 40, in particular 4 to 30, components as further components besides one or more compounds according to the invention. These media very particularly preferably contain 7 to 25 components besides one or more compounds according to the invention. These further components are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl cyclohexanecarboxylates, phenyl or cyclohexyl cyclohexylbenzoates, phenyl or cyclohexyl cyclohexylcyclohexanecarboxylates, cyclohexylphenyl esters of benzoic acid, of cyclohexanecarboxylic acid or of cyclohexylcyclohexanecarboxylic acid, phenylcyclohexane, cyclohexylbiphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl2-biphenylylethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The most important of the compounds which are suitable as further components of the media according to the invention can be characterized by the formulae 1, 2, 3, 4 and 5:

$$R'-L-E-R'' \qquad 1$$

$$R'-L-COO-E-R'' \qquad 2$$

$$R'-L-OOC-E-R'' \qquad 3$$

$$R'-L-CH_2CH_2-E-R'' \qquad 4$$

$$R'-L-C\equiv C-E-R'' \qquad 5$$

In the formulae 1, 2, 3, 4 and 5, L and E, which may be identical or different, are each, independently of one another, a bivalent radical from the group formed from —Phe—, —Cyc—, —Phe—Phe—, —Phe—Cyc—, —Cyc—Cyc—, Pyr—, —Dio—, —G—Phe— and —G—Cyc— and their mirror images, where Phe is 1,4-phenylene which is unsubstituted or substituted by fluorine, Cyc is trans-1,4-cyclohexylene or 1,4-cyclohexenylene, Pyr is pyrimidine-2,5-diyl or pyridine-2,5-diyl, Dio is 1,3-dioxane-2,5-diyl and G is 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe—Cyc. The media according to the invention preferably contain one or more components selected from the compounds of the formulae 1, 2, 3, 4 and 5, in which L and E are selected from the group comprising Cyc, Phe and Pyr and are simultaneously one or more components selected from the compounds of the formulae 1, 2, 3, 4 and 5, in which one of the radicals L and E is selected from the group comprising Cyc, Phe and Pyr and the other radical is selected from the group comprising —Phe—Phe—, —Phe—Cyc—, —Cyc—Cyc—, —G—Phe— and —G—Cyc—, and, if appropriate one or more components selected from the compounds of the formulae 1, 2, 3, 4 and 5, in which the radicals L and E are selected from the group comprising —Phe—Cyc—, —Cyc—Cyc—, —G—Phe— and —G—Cyc—.

In the compounds of the sub-formulae 1a, 2a, 3a, 4a and 5a, R' and R'', independently of one another, are each alkyl, alkenyl, alkoxy, alkenyloxy or alkanoyloxy having up to 8 carbon atoms. In most of these compounds, R' and R'' are different from one another, one of these radicals usually being alkyl or alkenyl. In the compounds of the sub-formulae 1b, 2b, 3b, 4b and 5b, R'' is —CN, —CF$_3$, F, Cl or ——NCS; in these compounds, R has the meaning given for the compounds of the sub-formulae Ia to 5a and is preferably alkyl or alkenyl. However, other variants of the proposed substituents in the compounds of the formulae 1, 2, 3, 4 and 5 are also common. Many such substances or alternatively mixtures thereof are commercially available. All these substances can be obtained by methods known from the literature or analogously thereto.

Besides components from the group comprising the compounds 1a, 2a, 3a, 4a and 5a (group 1), the media according to the invention preferably also contain components from the group comprising the compounds 1b, 2b, 3b, 4b and 5b (group 2), whose proportions are preferably as follows:

Group 1: 20 to 90%, in particular 30 to 90%,
Group 2: 10 to 80%, in particular 10 to 50%, with the sum of the proportions of the compounds according to the invention and of compounds from groups 1 and 2 adding up to 100%.

The media according to the invention preferably contain 1 to 40%, in particular preferably 5 to 30%, of compounds according to the invention. Further preferred media are those which contain more than 40%, in particular 45 to 90%, of compounds according to the invention. The media preferably contain three, four or five compounds according to the invention.

The media according to the invention are prepared in a manner which is customary per se. In general, the components are dissolved in one another, expediently at elevated temperature. By means of suitable additives, the liquid-crystalline phases can be modified according to the invention in a manner such that they can be used in all types of liquid-crystal display elements known hitherto.

Additives of this type are known to those skilled in the art and are described in detail in the literature (H. Kelker/R. Hatz, Handbook of Liquid Crystals, Verlag Chemie, Weinheim, 1980). For example, pleochroic dyes can be added for the preparation of colored guest-host systems or substances can be added to modify the dielectric anisotropy, the viscosity and/or the orientation of the nematic phases.

EXAMPLES

The examples below are intended to illustrate the invention without representing a limitation. mp.=melting point, cp.=clear point. Above and below, percentages are percent by weight; all temperatures are given in degrees Celsius. "Customary work-up" means that water is added, the product is extracted with methylene chloride, the organic phase is separated off, dried and evaporated, and the product is purified by crystallization and/or chromatography.

Furthermore, the following symbols have the meaning shown:

C: Crystalline solid state, S: smectic phase (the index denotes the phase type), N: nematic state, Ch: cholesteric phase, I: isotropic phase. The number between two symbols indicates the conversion temperature in degrees Celsius.

EXAMPLE 1

0.1 mol of 2,3-difluoro-4-ethoxybenzoic acid (preparable from 2,3-difluorophenol by alkylation using diethyl sulfate/potassium carbonate in dimethylformamide, metallation of the 2,3-difluorophenetole in the 4-position using butyllithium/tetramethylethylenediamine in tetrahydrofuran at −70° to −80° and reaction with solid carbon dioxide), 0.01 mol of 4-dimethylaminopyridine and 0.1 mol of 2-pentyl-5-hydroxypyridine are initially introduced in 150 ml of dichloromethane, a solution of 0.1 mol of dicyclohexylcarbodiimide in 30 ml of dichloromethane is added dropwise at 10° with stirring, and the mixture is subsequently stirred at room temperature for 15 hours. The mixture is filtered through silica gel with suction, and 5-(2-pentylpyridyl) 2,3-difluoro-4-ethoxybenzoate is obtained after customary work-up.

The following are prepared analogously:

2-(5-octylpyridyl)-2,3-difluoro-4-heptyloxybenzoate 2-(5-nonylpyrimidyl)-2,3-difluoro-4-nonyloxybenzoate.

EXAMPLE 2

2,3-difluoropropylbenzene is obtained by lithiation of o-difluorobenzene at −70° to −80° and reaction with propion-aldehyde, dehydration of the secondary alcohol produced and subsequent hydrogenation of the double bond. Further metallation and reaction with dry ice gives 2,3-difluoro-4-propylbenzoic acid. From this acid, 4-(5-heptylpyrimidin-2-yl)phenyl 2,3-difluoro-4-propylbenzoate, mp. 69°, cp. 138°, is obtained analogously to Example 1 by esterification using 2-(4-hydroxyphenyl)-5-heptylpyrimidine and dicyclohexylcarbodiimide.

The following are prepared analogously:

4-(5-heptylpyrimidin-2-yl)phenyl 2,3-difluoro-4-octyloxybenzoate

EXAMPLE 3

2,3-Difluoro-4-nonylbenzoic acid is obtained by reaction of o-difluorobenzene with butyllithium in the presence of potassium tertiary-butoxide at −90° to −100° in tetrahydrofuran, alkylation of the potassium compound formed using nonyl bromide/1,3-dimethyltetrahydro-2-(1H)-pyrimidinone (DMPU), isolation of the 2,3-difluorononylbenzene, re-metallation by means of butyllithium and subsequent reaction with solid carbon dioxide. Esterification of this acid using 2-(4-hydroxyphenyl)-5-octylpyridine analogously to Example 1 gives 4-(5-octylpyridin-2-yl)phenyl 2,3-difluoro-4-nonylbenzoate.

The following is prepared analogously:

4-(5-octylpyridin-2-yl)phenyl 2,3-difluoro-4-octyloxybenzoate.

EXAMPLE 4

0.1 mol of 2,3-difluoro-4-ethoxybenzoic acid (preparable from 2,3-difluorophenol by alkylation using diethyl sulfate/potassium carbonate in dimethylformamide, metallation of the 2,3-difluorophenetole in the 4-position using butyllithium/tetramethylethylenediamine in tetrahydrofuran (THF) at −70° to −80° and reaction with solid carbon dioxide), 0.01 mol of 4-dimethylaminopyridine and 0.1 mol of trans-4-propylcyclohexanol are initially introduced in 150 ml of dichloromethane, a solution of 0.1 mol of dicyclohexylcarbodiimide in 30 ml of dichloromethane is added dropwise at 10° with stirring, and the mixture is subsequently stirred at room temperature for 15 hours. The mixture is filtered through silica gel with suction, the solvent is evaporated, and trans-4-propylcyclohexyl 2,3-difluoro-4-ethoxybenzoate is obtained as a residue and is purified by crystallization. Mp. 93°, cp. (48°).

EXAMPLE 5

2,3-Difluoro-4-propylbenzene is obtained by lithiation of o-difluorobenzene at −70° to −80° and reaction with propionaldehyde, dehydration of the secondary alcohol produced and subsequent hydrogenation of the double bond. Further metallation and reaction with dry ice gives 2,3-difluoro-4-propylbenzoic acid. From this acid, trans-4-(trans-4-propylcyclohexyl)cyclohexyl 2,3-difluoro-4-propylbenzoate, mp. 65°, cp. 165.2°, is obtained analogously to Example 1 by esterification using trans-4-(trans-4-propylcyclohexyl)cyclohexanol and dicyclohexylcarbodiimide.

The following is prepared analogously:

trans-4-(trans-4-pentylcyclohexyl)cyclohexyl 2,3-difluoro-4-octyloxybenzoate, C 90° $S_c$ 98 N 170.3 I.

EXAMPLE 6

2,3-Difluoro-4-pentylbenzoic acid is obtained by reacting o-difluorobenzene with butyllithium in the presence of potassium tertiary-butoxide at −90° to −100° in tetrahydrofuran, alkylating the potassium compound formed using pentyl bromide/1,3-dimethyltetrahydro-2-(1H)-pyrimidinone (DMPU), isolating the 2,3-difluoropentylbenzene, re-metallating by means of butyllithium and subsequently reacting with solid carbon dioxide. Esterification of this acid using trans-4-pentylcyclohexanol gives trans-4-pentylcyclohexyl 2,3-difluoro-4-pentylbenzoate.

EXAMPLE 7

0.1 mol of 2,3-difluoro-4-ethoxybenzoic acid (preparable from 2,3-difluorophenol by alkylation using diethyl sulfate/potassium carbonate in dimethylformamide (DMF), metallation of the 2,3-difluorophenetole in the 4-position using butyllithium/tetramethylethylenediamine in tetrahydrofuran (THF) at −70° to −80° and reaction with solid carbon dioxide), 0.01 mol of 4-dimethylaminopyridine and 0.1 mol of 4-hydroxy-4'-pentylbiphenyl are initially introduced in 150 ml of dichloromethane, a solution of 0.1 mol of dicyclohexylcarbodiimide in 30 ml of dichloromethane is added dropwise at 10° with stirring, and the mixture is subsequently stirred at room temperature for a further 15 hours. The mixture is filtered through silica gel with suction, the solvent is evaporatated, and 4-(4'-pentylbiphenylyl)2,3-difluoro-4-ethoxybenzoate is obtained and is purified by crystallization; mp. 94°, cp. 206.6°.

EXAMPLE 8

4-Pentylphenyl 2,3-difluoro-4-ethoxybenzoate is obtained analogously to Example 1 by reacting 2,3-difluoro-4-ethoxybenzoic acid with 4-pentylphenol; mp. 61°, cp. (50.7°).

The following is prepared analogously:

4-octylphenyl 2,3-difluoro-4-octyloxybenzoate, C 37° $S_c$ 50° N 57.1° I.

EXAMPLE 9

2,3-Difluoropropylbenzene is obtained by lithiating o-difluorobenzene at −70° to −80° and reacting with propionaldehyde, dehydrating the secondary alcohol produced and subsequently hydrogenating the double bond. Re-metallation and reaction with dry ice gives 2,3-difluoro-4-propylbenzoic acid. From this acid, 4-(4'-pentylbiphenyl) 2,3-difluoro-4-propylbenzoate, C 74° $S_c$ 86° N 160.1° I, is obtained analogously to Example 1 by esterification using 4-pentyl-4'-hydroxybiphenyl anddicyclohexylcarbodiimide.

EXAMPLE 10

4-(trans-4-Ethylcyclohexyl)phenyl 2,3-difluoro-4-propylbenzoate, C 70° N 134.9° I, is obtained by analogous esterification of 2,3-difluoro-4-propylbenzoic acid using 4-(trans-4-ethylcyclohexyl)phenol.

The following is prepared analogously:

4-(trans-4-pentylcyclohexyl)phenyl 2,3-difluoro-4-octyloxybenzoate, C 58° $S_c$ 96° N 160.8° I.

EXAMPLE 11

2,3-Difluoro-4-pentylbenzoic acid is obtained by reacting o-difluorobenzene with butyllithium in the presence of potassium tertiary-butoxide at −90° to −100° in tetrahydrofuran, alkylating the potassium compound formed using pentyl bromide/1,3-dimethyltetrahydro-2-(1H)-pyrimidinone (DMPU), isolating the 2,3-difluoropentylbenzene, re-metallation by means of butyllithium and subsequent reaction with solid carbon dioxide.

Esterification of this acid using 4-hexyloxyphenol by the above-described process gives 4-hexyloxyphenyl 2,3-difluoro-4-pentylbenzoate.

EXAMPLE 12

4-(2,3-Difluoro-4'-propylbiphenylyl) 2,3-difluoro-4-pentylbenzoate is obtained analogously. The 4-hydroxy-2,3-difluoro-4'-propylbiphenyl which is necessary for this purpose is prepared as follows:

2,3-Difluoro-4'-propylbiphenyl is obtained by lithiation of o-difluorobenzene at −70° to −80°, reaction with 4-propylcyclohexanone, dehydration of the tert. alcohol and subsequent aromatization of the cyclohexene ring. Further metallation and reaction with N-formylpiperidine gives 2,3-difluoro-4'-propylbiphenyl-4-carbaldehyde. The aldehyde is oxidized using 3-chloroperbenzoic acid in methylene chloride by the method of Baeyer-Villinger to form the formate, which is subsequently subjected to alkaline hydrolysis to give the phenol desired.

The examples below relate to liquid-crystalline phases according to the invention:

EXAMPLE A

A liquid-crystalline phase comprising

3% of 2-p-heptyloxyphenyl-5-heptylpyrimidine,
5% of 2-p-nonyloxyphenyl-5-heptylpyrimidine,
7% of 2-p-hexyloxyphenyl-5-nonylpyrimidine,
22% of 2-p-nonyloxyphenyl-5-nonylpyrimidine,
5% of 2-(5-octylpyridyl) 2,3-difluoro-4-heptyloxybenzoate,
9% of 4-(5-octylpyridin-2-yl)phenyl 2,3-difluoro-4-octyloxybenzoate,
7% of r-1-cyano-cis-4-(4'-heptylbiphenyl-4-yl)-1-hexylcyclohexane,
12% of r-1-cyano-cis-4-(4'-octylbiphenyl-4-yl)-1-butylcyclohexane,
20% of r-1-cyano-cis-4-(4'-nonyloxybiphenyl-4-yl)-1-octylcyclohexane and
10% of optically active p-(5-nonylpyrimidin-2-yl)phenyl 2-cyano-2-methylhexanoate exhibits $S_c$ 64 $S_A$ 76 Ch 85 I and a spontaneous polarization of 21 nC/cm$^2$ at room temperature.

EXAMPLE B

A liquid-crystalline phase comprising

6% of 2-p-octyloxyyphenyl-5-octylpyrimidine,
8% of 2-p-nonyloxyphenyl-5-octylpyrimidine,
6% of 2-p-octyloxyphenyl-5-nonylpyrimidine,
24% of 2-p-nonyloxyphenyl-5-nonylpyrimidine,
7% of 2-(5-nonylpyrimidyl) 2,3-difluoro-4-nonyloxybenzoate,
5% of 4-(5-heptylpyrimidin-2-yl)phenyl 2,3-difluoro-4octyloxybenzoate,
8% of 2-(p-heptyloxyphenyl)-5-(pentylphenyl)-1,3,4-thiadiazole,
9% of 2-(p-octyloxyphenyl)-5-(p-heptylphenyl)-1,3,4-thiadiazole,
15% of r-1-cyano-cis-4-(4'-octyloxybiphenyl-4-yl)-1-hexylcyclohexane and
12% of optically active p-(5-octylpyrimidin-2-yl)phenyl 2-chloro-3-methylbutyrate exhibits $S_c$ 63 $S_A$ 67 Ch 72 I and a spontaneous polarization of 15 nC/cm² at room temperature.

EXAMPLE C

A nematic liquid-crystal phase is prepared, comprising
4% of 10 4% of p-trans-4-heptylcyclohexylbenzonitrile,
5% of 2-p-cyanophenyl-5-butyl-1,3-dioxane,
4% of 2-p-cyanophenyl-5-pentyl-1,3-dioxane,
8% of p-cyanophenyl p-ethylbenzoate,
6% of p-cyanophenyl p-propylbenzoate,
8% of p-propylphenyl p-trans-4-propylcyclohexylbenzoate,
8% of p-pentylphenyl p-trans-4-propylcyclohexylbenzoate,
8% of p-propylphenyl p-trans-4-pentylcyclohexylbenzoate,
6% of p-methoxyphenyl trans-4-propylcyclohexanecarboxylate,
6% of p-ethoxyphenyl trans-4-propylcyclohexanecarboxylate,
10% of trans-1-p-propylphenyl-4-pentylcyclohexane,
4% of p-butylphenyl p-(p-hexyloxybenzoyloxy)benzoate,
7% of p-pentylphenyl p-hexyloxybenzoate and
16% of 5-(2-pentylpyridyl) 2,3-difluoro-4-ethoxybenzoate.

EXAMPLE D

A nematic mixture is prepared, comprising
7% of 2-p-cyanophenyl-5-propyl-1,3-dioxane,
7% of 2-p-cyanophenyl-5-butyl-1,3-dioxane,
6% of 2-p-cyanophenyl-5-pentyl-1,3-dioxane,
10% of trans-1-p-propylphenyl-4-pentylcyclohexane,
8% of 4-cyano-4'-(trans-4-pentylcyclohexyl)biphenyl,
6% of 4-ethyl-4'-(trans-4-pentylcyclohexyl)biphenyl,
4% of 4-ethyl-4'-(trans-5-propylcyclohexyl)biphenyl,
5% of 2-p-pentyloxyphenyl-5-hexylpyrimidine,
6% of 2-p-heptyloxyphenyl-5-hexylpyrimidine,
5% of 2-p-methoxyphenyl-5-heptylpyrimidine,
8% of 2-p-heptyloxyphenyl-5-heptylpyrimidine,
8% of 2-p-nonyloxyphenyl-5-heptylpyrimidine,
7% of trans-4-propylcyclohexyl 2,3-difluoro-4-ethoxybenzoate,
5% of trans-4-(trans-4-propylcyclohexyl)cyclohexyl 2,3-difluoro-4-propylbenzoate,
4% of p-methoxyphenyl trans-4-propylcyclohexanecarboxylate and
4% of p-trans-4-propylcyclohexylphenyl butyrate.

EXAMPLE E

A nematic mixture is prepared, comprising
15% of p-trans-4-propylcyclohexylbenzonitrile,
27% of trans-1-p-ethylphenyl-4-propylcyclohexane,
10% of trans-1-p-ethoxyphenyl-4-propylcyclohexane,
7% of 4-cyano-4'-(trans-4-pentylcyclohexyl)biphenyl,
8% of 4-ethyl-4'-(trans-4-pentylcyclohexyl)biphenyl,
9% of 4-ethyl-4'-(trans-4-propylcyclohexyl)biphenyl,
10% 4-pentylcyclohexyl)-4'-(trans-4-propylcyclohexyl)biphenyl and
19% of trans-4-propylcyclohexyl 2,3-difluoro-4-ethoxybenzoate.

EXAMPLE F

A liquid-crystalline phase comprising
11% of 4-octyloxyphenyl 4-decyloxybenzoate,
13% of 4-decyloxyphenyl 4-decyloxybenzoate,
8% of 4-nonylphenyl 2,3-difluoro-4-nonyloxybenzoate,
12% of 4-heptylphenyl p-(4-octyloxyphenyl)benzoate,
14% of 4'-octyloxybiphenyl-4-yl 4-heptyloxybenzoate,
7% of 4'-octylbiphenyl-4-yl 2,3-difluoro-4-nonyloxybenzoate,
5% of 4'-octyloxy-2,3-difluorobiphenyl-4-yl 2,3-difluoro-4-pentylbenzoate,
5% of 4'-octyloxy-2',3'-difluorobiphenyl-4-yl 4-nonyloxybenzoate,
11% of 4'-nonyloxybiphenyl-4-yl 4-heptyoxybenzoate and
14% of optically active p-(5-heptylpyrimidin-2-yl)phenyl 2-chloro-3-methylbutyrate
exhibits $S_c$ 58 $S_A$ 66 Ch 78 I and a spontaneous polarization of 18 nC/cm² at room temperature.

We claim:

1. A 2,3-difluorobenzoic acid compound of the formula I,

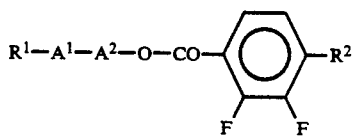

in which $R^1$ and $R^2$, independently of one another, are each an alkyl group having 1 to 15 C atoms, in which, in addition, one or two non-adjacent $CH_2$ groups may be replaced by —O—, —CO—, —CH=CH— and/or —C≡C—, and $A^1$ and $A^2$, independently of one another, are each 1,4-phenylene which is unsubstituted or substituted by one or two fluorine atoms, and in which, in addition, one or two CH groups may be replaced by N, or are trans-1,4-cyclohexylene, or one of the two $A^1$ and $A^2$ groups is alternatively a single bond, and wherein at least one of the groups $A_1$ and $A^2$ is a 1,4-phenylene group in which one or two CH groups are replaced by N.

2. A compound according to claim 1, wherein at least one of $A^1$ and $A^2$ is pyridine-2,5-diyl, pyrimidine-2,5-diyl, or pyridazine-2,5-diyl.

3. A compound according to claim 2, wherein said compound is of the formula

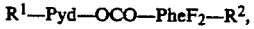

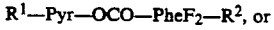

wherein

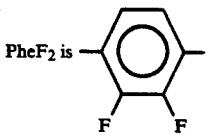

Pyd is pyridine-2,5-diyl,
Pyr is pyrimidine-2,5-diyl, and
Pyn is pyridazine-2,5-diyl.

4. A compound according to claim 2, wherein said compound is of the formula

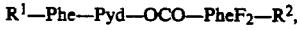

R¹—Phe—Pyr—OCO—PheF₂—R²,

R¹—Phe—Pyn—OCO—PheF₂—R²,

R¹—Pyd—Phe—OCO—PheF₂—R²,

R¹—Pyr—Phe—OCO—PheF₂—R²,

R¹—Pyn—Phe—OCO—PheF₂—R²,

R¹—Pyd—Cyc—OCO—PheF₂—R²,

R¹—Pyr—Cyc—OCO—PheF₂—R²,

R¹—Pyn—Cyc—OCO—PheF₂—R²,

R¹—Cyc—Pyd—OCO—PheF₂—R²,

R¹—Cyc—Pyr—OCO—PheF₂—R², or

R¹—Cyc—Pyn—OCO—PheF₂—R² wherein

PheF₂ is 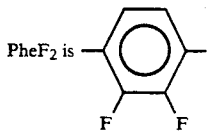

Cyc is 1,4-cyclohexylene,
Pyd is pyridine-2,5-diyl,
Pyr is pyrimidine-2,5-diyl, and
Pyn is pyridazine-2,5-diyl.

5. A compound according to claim 4, wherein said compound is of the formula

R¹—Pyd—Phe—OCO—PheF₂—R²,

R¹—Pyr—Phe—OCO—PheF₂—R², or

R¹—Pyn—Phe—OCO—PheF₂—R².

6. A compound according to claim 1, wherein at least one of R¹ and R² is alkenyl or oxaalkyl.

7. A compound according to claim 1, wherein at least one of the groups A¹ and A² is pyridine-2,5-diyl.

8. A compound according to claim 1, wherein at least one of the groups A¹ and A² is pyridazine-2,5-diyl.

9. A compound according to claim 1, wherein at least one of the groups A¹ and A² is pyrazine-3,6-diyl.

10. A compound according to claim 1, wherein R¹ and R² are each, independently, alkyl or alkoxy.

11. A compound according to claim 1, wherein R¹ and R² are each independently, a straight-chain alkyl group having 1–15 C atoms wherein one or two non-adjacent CH₂ groups can each be replaced by an O atoms, or a straight-chain alkyl radical having 1–15 C atoms wherein one CH₂ group can be replaced by —CH=CH—.

12. A compound according to claim 1, wherein said compound is:
5-(2-pentylpyridyl) 2,3-difluoro-4-ethoxybenzoate;
2-(5-octylpyridyl)-2,3-difluoro-4-heptyloxybenzoate;
2-(5-nonylpyrimidyl)-2,3-difluoro-4-nonyloxybenzoate;
4-(5-heptylpyrimidin-2-yl)phenyl 2,3-difluoro-4-propylbenzoate;
4-(5-heptylpyrimidin-2-yl)phenyl 2,3-difluoro-4-octyloxybenzoate;
4-(5-octylpyridin-2-yl)phenyl 2,3-difluoro-4-nonylbenzoate; or
4-(5-octylpyridin-2-yl)phenyl 2,3-difluoro-4-octyloxybenzoate.

13. A 2,3-difluorobenzoic acid compound of formula

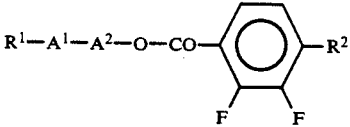   I in which
R¹ and R², independently of one another, are each a straight-chain alkyl group having 1 to 15 C atoms, in which, in addition, one or two non-adjacent CH₂ groups may each be replaced by —O—, —CO—, —CH=CH— and/or —C≡C—, and
A¹ and A², independently of one another, are each 1,4-phenylene which is unsubstituted or substituted by one or two fluorine atoms, or are trans-1,4-cyclohexylene.

14. In a liquid-crystalline phase comprising at least two liquid-crystalline components, the improvement wherein said phase is a chirally tilted smectic phase, and at least one component is a 2,3-difluorobenzoic acid compound of formula I

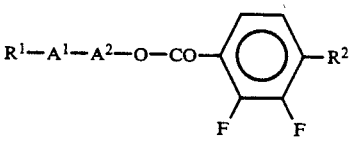   I in which
R¹ and R², independently of one another, are each a straight-chain alkyl group having 1 to 15 C atoms, in which, in addition, one or two non-adjacent CH₂ groups may be replaced by —O—, —CO—, —CH=CH— and/or —C≡C—, and
A¹ and A², independently of one another, are each 1,4-phenylene which is unsubstituted or substituted by one or two fluorine atoms, and in which, in addition, one or two CH groups may be replaced by N, or are trans-1,4-cyclohexylene, or one of the two A¹ and A² groups is alternatively a single bond.

15. In an electrooptical display element, comprising a dielectric, the improvement wherein said dielectric is a phase according to claim 14.

16. A liquid-crystalline phase according to claim 14, wherein

—A¹—A²— is 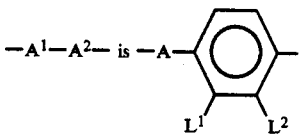

in which
A is 1,4-phenylene which is unsubstituted or substituted by one or two fluorine atoms, or is trans-1,4-cyclohexylene or a single bond, and $L^1$ and $L^2$, independently of one another, are each H or F.
17. A liquid crystalline phase according to claim 14, wherein
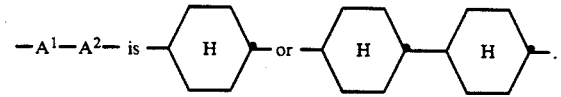
18. A liquid-crystalline display according to claim 15, wherein said display is a rapid switching display based on SSFLC technology.
* * * * *